(No Model.)
9 Sheets—Sheet 1.

J. H. WHITE.
MATCH MACHINE.

No. 410,622. Patented Sept. 10, 1889.

Fig. 1.

Attest:
Sidney P. Hollingsworth
W. R. Kennedy

Inventor:
J. H. White
By his Atty
Phil. T. Dodge (No Model.) 9 Sheets—Sheet 4.

J. H. WHITE.
MATCH MACHINE.

No. 410,622. Patented Sept. 10, 1889.

Fig. 4.
ON LINE 4—4

Attest.
Sidney P. Hollingworth
F. A. Kennedy

Inventor:
J. H. White
By his Atty
Phil. T. Dodge (No Model.) 9 Sheets—Sheet 5.
J. H. WHITE.
MATCH MACHINE.

No. 410,622. Patented Sept. 10, 1889.

(No Model.) 9 Sheets—Sheet 7.

J. H. WHITE.
MATCH MACHINE.

No. 410,622. Patented Sept. 10, 1889.

Fig. 16.
ON LINE 16—16

Attest:
Sidney P. Hollingsworth
W. R. Kennedy

Inventor:
Jno. H. White
By his Atty
Phil. T. Dodge

N. PETERS, Photo-Lithographer, Washington, D. C.

(No Model.) 9 Sheets—Sheet 8.
J. H. WHITE.
MATCH MACHINE.

No. 410,622. Patented Sept. 10, 1889.

Fig. 24. ON LINE 24-24

Attest:
Sidney P. Hollingsworth
W. R. Kennedy

Inventor:
J. H. White
By his Atty
Phil. T. Dodge

N. PETERS, Photo-Lithographer, Washington, D. C.

(No Model.)  9 Sheets—Sheet 9.

J. H. WHITE.
MATCH MACHINE.

No. 410,622.  Patented Sept. 10, 1889.

Attest:
Sidney P. Hollingsworth
N. R. Kennedy

Inventor:
J. H. White
By his Atty
Phil T. Dodge

UNITED STATES PATENT OFFICE.

JOHN H. WHITE, OF WASHINGTON, DISTRICT OF COLUMBIA.

MATCH-MACHINE.

SPECIFICATION forming part of Letters Patent No. 410,622, dated September 10, 1889.

Application filed February 4, 1887. Serial No. 226,565. (No model.)

*To all whom it may concern:*

Be it known that I, JOHN H. WHITE, of Washington, in the District of Columbia, have invented certain Improvements in Match-Machines, of which the following is a specification.

My invention relates to an organized machine comprising as its leading elements the following mechanisms: first, a trough or guide to receive the wooden blanks and mechanism for advancing said blanks step by step through said guide and holding them firmly in position during the intervals of rest; second, a reciprocating blade which acts across the exposed end of the blank to remove a slice therefrom, and means for transferring said slice and supporting the same in front of a second series of knives; third, a series of parallel knives and actuating device by which they are caused to separate the slice into splints or sticks; fourth, the mechanism by which the series of splints are supported, advanced, and transferred to supporting-frames; fifth, frames of improved construction by which the splints are supported in order that they may be conveniently dipped or coated at the ends.

In the accompanying drawings.

Referring to the various figures of the drawings, A represents the rigid main frame, which may be of any form and construction adapted to give support to the various operative parts hereinafter described.

As shown in the drawings, the frame consists, essentially, of a base portion giving support to two vertical parallel plates $a$ and $b$, forming, respectively, the front and the back of the frame. Transversely of the frame, near its top, is fixed a horizontal trough or ejector B, intended to receive and guide the wooden blocks or blanks B', which are passed therein one behind another. In order to urge the entire series of blocks forward, I prefer to arrange in the outer end of the ejector a sliding block $B^2$, attached to one end of a cord $B^3$, which is passed over suitable guide-pulleys and attached to a weight $B^4$, which acts to urge the slide inward, and thus force the entire series of blocks forward through the guide.

For the purpose of advancing the forward block at proper intervals a definite distance equal to the thickness of the slice to be removed therefrom, and to hold it in position during the slicing operation, I provide a feed mechanism. (Clearly shown in Figs. 1, 2, 6, and 8.) This consists, primarily, of a head or slide C, having on its under side a series of teeth which act downward through the top of the guide or ejector B, entering and firmly engaging the top of the forward blank or blanks. This feeder C is extended rearward and pivoted to an actuating-arm C' on a rock-shaft $C^2$, having a second arm $C^3$, which is connected by a rod $C^4$ to a lever $C^5$, which is in turn pivoted to the main frame and provided at its free end with a stud or roller $C^6$, acted upon by a cam-wheel $C^7$, mounted on a horizontal shaft $C^8$, lying lengthwise in the base of the frame and supported in bearings therein. This cam acts through the intermediate parts to move the feeding-head C, still in engagement with the blank, positively forward. Its retraction is effected by a spring $C^9$, connected to the lever C' and to a stationary pin.

In order to raise and lower the feeding-head C to engage its teeth with and disengage them from the blank, I groove its two sides to receive rollers on arms $C^{10}$, which are carried by a rock-shaft $C^{11}$, this shaft being in turn provided with a second arm $C^{12}$, jointed to a rod $C^{13}$, which is extended downward and provided at its lower end with a roller bearing on a lifting-cam $C^{14}$, mounted on the shaft $C^8$, before referred to. A spring $C^{15}$ tends to depress the arm $C^{12}$, and thus lift the feeding-head out of action, while the cam acts at the proper time to effect its depression.

Figure 2:
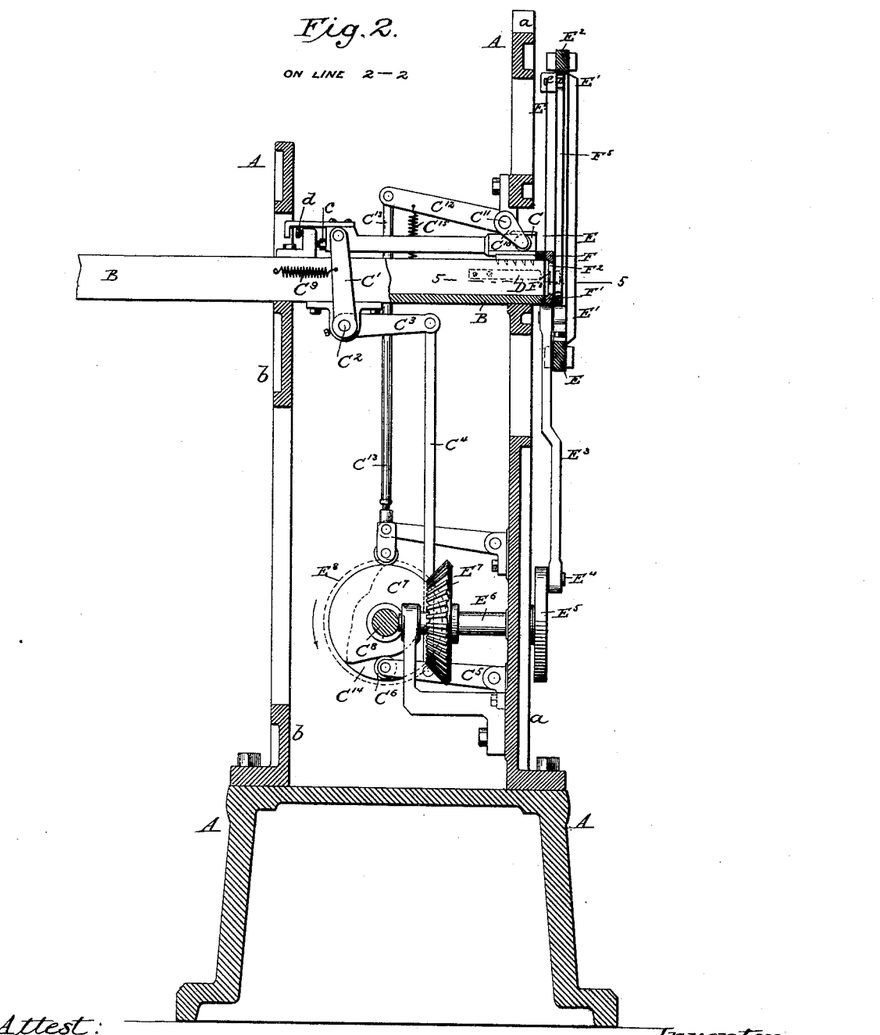
Fig. 2 is a vertical section through the machine from front to rear on the line 2 2 of Fig. 1, looking in the direction indicated by the arrow.

The feed mechanism as a whole operates as follows: During the slicing action the feeding-head C is depressed and remains at rest, as shown in Fig. 2, its teeth engaging and holding the forward blank. At the completion of the slicing action the cam $C^{14}$ permits the rod $C^{13}$ to fall, whereupon the arms $C^{10}$ lift the feeding-head out of action. While it is thus lifted the cam $C^7$ acts through the lever $C^5$ and intermediate parts to effect a positive retraction of the feeding-head a distance equal to the thickness of the required slice. This rearward movement being completed, the cam $C^{14}$ acts to throw the head downward again into engagement with the blank and to hold it in this position. While it is thus held the cam $C^7$ acts to move the head forward and advance the blank until it is projected the required distance beyond the path of the knife, to be hereinafter described.

Inasmuch as the thickness of the slice is determined by the length of movement of the feeding-head C, I provide means for accurately determining and changing the length of this movement at will. As shown in Fig. 2, the means to this end consist of a screw $c$, tapped into the frame to arrest the backward movement of the head, and a screw $d$, tapped into the frame to encounter an arm on the head and limit its forward movement.

It will be observed that as the roller $C^6$ on the arm $C^5$ travels on the peripheral surface of the cam $C^8$ the movement of the head C is not limited thereby, and as the roller would be thrown outward from the cam-surface if the machine were operating rapidly the movement of the head would be irregular. The employment of the stops $c$ and $d$ prevents the irregular movement of the head by positively limiting its motion.

It will be perceived that by the combinations above recited the feeding-head is thrown positively into and out of action and positively forward and backward, and that its movement is controlled with great precision, the result being that the blank is advanced positively to the exact distance required and held positively in position during the proper intervals.

Figure 20:
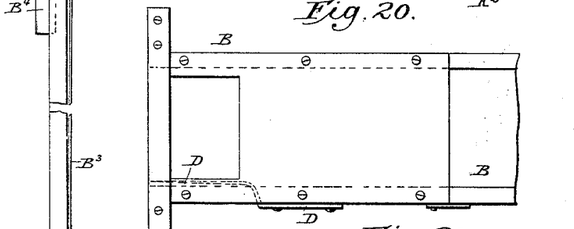
Fig. 20 is a plan view of the mouth of the guide or channel through which the blocks are advanced.
Figure 21:
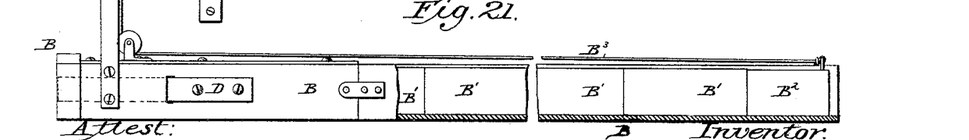
Fig. 21 is a side elevation of the guide and feed mechanism by which the blanks are advanced therethrough.

As an additional means of guiding and holding the blanks as they are projected beyond the mouth of the guide B, I apply to the side of the latter a horizontal spring-arm D, (clearly shown in Figs. 20 and 21,) the forward end of which lies within the guide in position to bear against the side of the forward blank and hold the same snugly against the opposite wall, toward which the blank is urged by the advancing knife. This spring also prevents the slide from carrying the line of blanks forward when the feeding-head is raised.

Passing now to the means for removing the slice from the projected end of the blank, attention is directed particularly to Figs. 1, 2, 5, 6, and 8, in which E represents the slicing-knife, in the form of a thin blade sharpened at one edge and mounted, under high tension in a vertical position in a carrying-frame E'. This frame may be of any appropriate form, and the knife may be secured therein in any suitable manner; but I recommend a frame having on its inner side two projecting lugs $e$ and $f$ to receive the ends of the knife, the upper lug being fixed and the lower lug mounted on a dovetail rib or guide and provided with an adjusting-screw $g$, by which it may be moved to increase or diminish the tension of the blade. The knife-frame E' is jointed at its upper and lower ends to two supporting-arms $E^2$, connected at their opposite ends to the frame by horizontal pivots, the arrangement being such that as the frame is urged upward and downward it will be caused to carry the knife with a shearing action across the mouth of the conductor B and the wooden block projected therefrom, its effect being to remove from the end of the block a thin unbroken slice having a thickness equal to that of the required splints or sticks. The connection of the knife-frame to the swinging arms is advantageous in that they cause the edge of the knife to move both downward and forward as it advances across the blank, thus giving the shear or draw cut before alluded to.

The lower arm $E^2$ is connected by a pitman $E^3$ to a wrist $E^4$ of a crank or crank-wheel $E^5$, mounted on a small shaft $E^6$. This shaft lies at right angles to the main shaft $C^8$, and is driven therefrom through miter-gear $E^7$ and $E^8$, the arrangement being such that the knife advances and retreats during the time that the feed-machine holds the block at rest, the block being advanced after each retreat of the knife and before it is again carried forward.

It is necessary to the subsequent operations of the machine that the slice as it is removed from the block by the knife shall be properly supported outside of the knife in order that it may not be splintered or fractured, and that it may be properly guided for presentation to the dividing-knives, hereinafter explained. To this end I secure on the front of the machine two horizontal bars or guides F and F', lying across and extending beyond the mouth of the guide or channel through which the blocks emerge. On their inner faces these blocks are recessed or rabbeted in a longitudinal direction in such manner that they will receive and support the upper and lower edges of the slice and serve as guides to support the same when it is severed from the block and while it is being carried horizontally to the dividing-knives, as presently explained.

Figure 1:
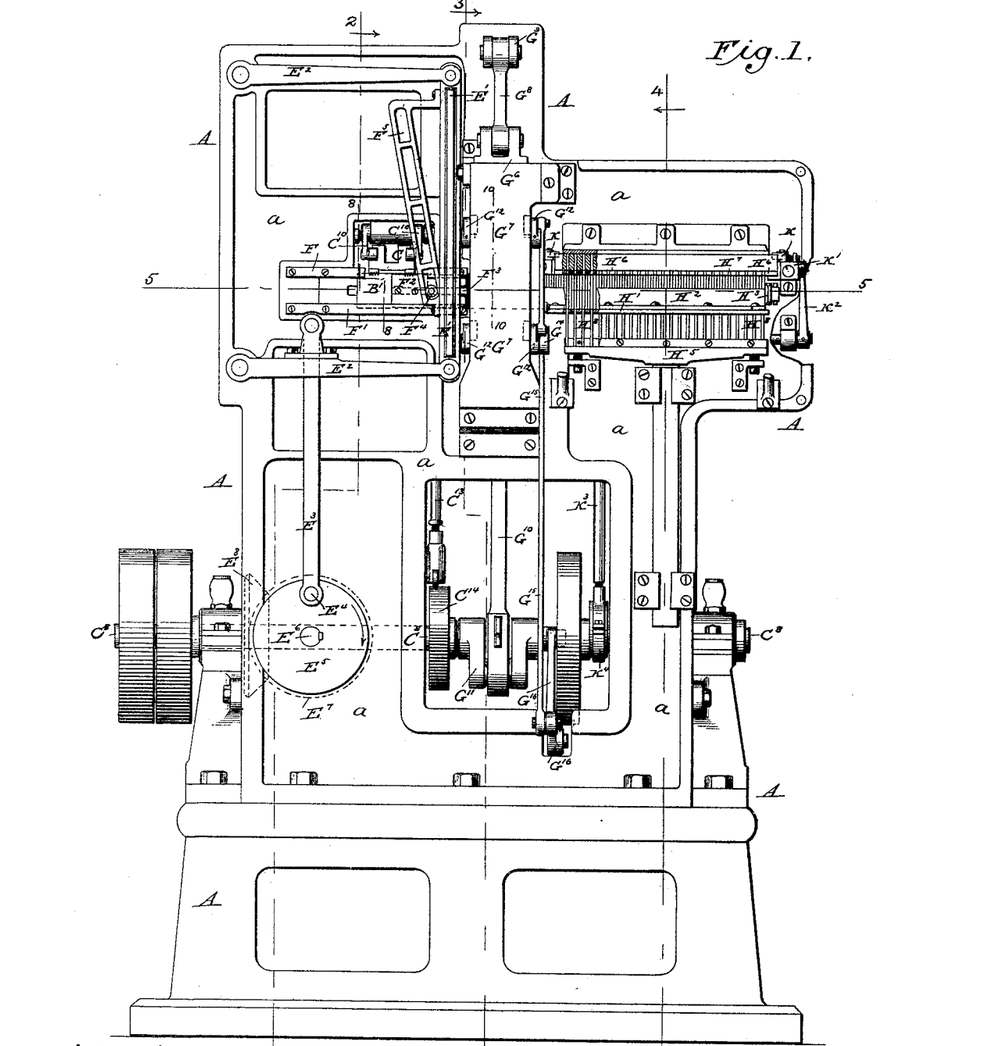
Figure 1 represents a front elevation of my machine, a portion of the framing mechanism being broken away to show its internal structure.

For the purpose of thus carrying the slice to the dividing-knives, I mount between the inner edges of the guides F and F' a horizontally-reciprocating plate $F^2$, bearing at one edge a spring finger or dog $F^3$. On its outer face this slide has a stud or roller $F^4$ entering an oblique slotted bar $F^5$, secured to the knife-carrying frame, as shown in Fig. 1. When the knife is in its normal position, the plate $F^2$ stands in front of the blank; but as the knife descends to sever the slice the inclined frame moves the plate $F^2$ to the left, carrying its finger backward across the outer surface of the slice, until finally the end of the finger drops behind the left edge of the slice. As the knife-frame ascends the oblique bar advances the slice and finger rapidly to the right, the finger pushing the slice before it between the two supporting-bars F and F' until the slice finally reaches a position considerably to the right of the blank and directly opposite the dividing-knives, which will now be described.

Figures 8, 9, 10, 11, 12, 13:
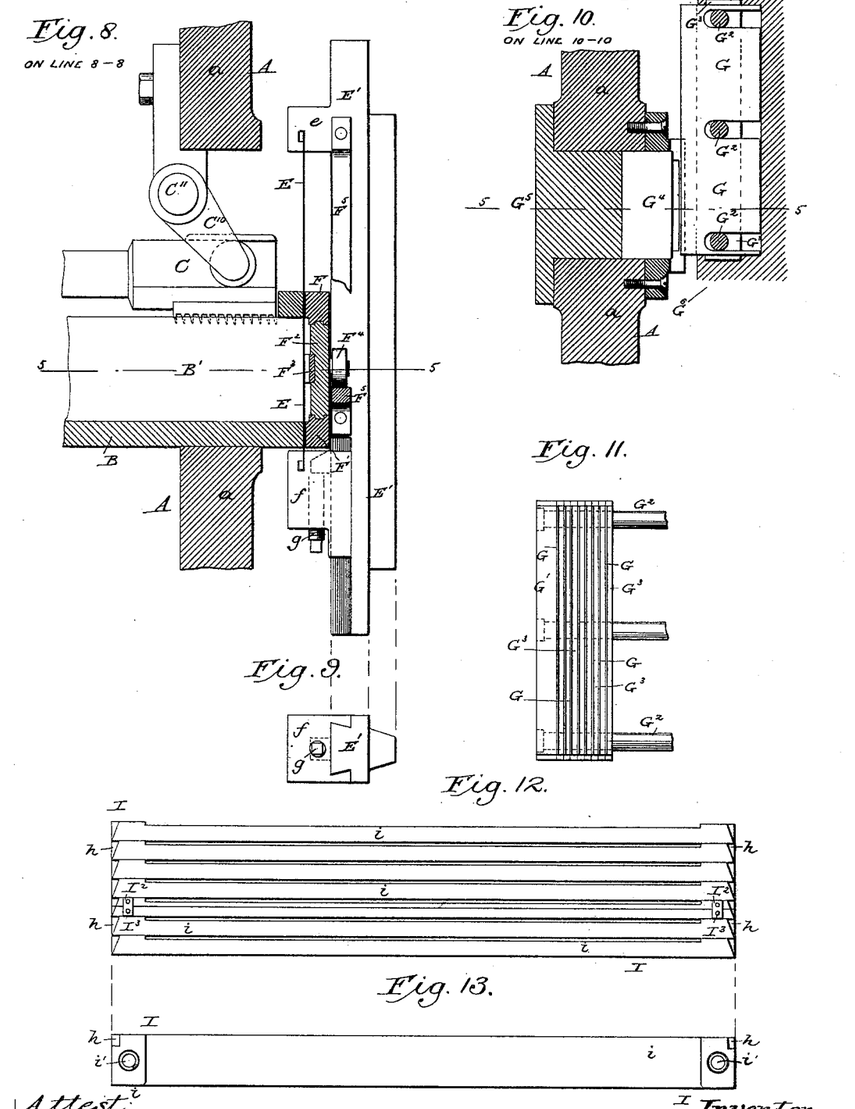
Fig. 8 is a vertical section on the line 8 8 of Figs. 1 and 6, showing more particularly the devices for feeding and holding the blank and the arrangement of the slicing-knife and slice-carrying devices.
Fig. 9 is an end view of the knife-supporting head.
Fig. 10 is a vertical section on the line 10 10 of Figs. 5 and 6 through the slicing-knives and the anvil against which they act.
Fig. 11 is a front view showing the construction of the head in which the dividing-knives are mounted.
Fig. 12 is a plan view showing the construction of the frames into which the splints are delivered and the manner of coupling said frames together.
Fig. 13 is a side elevation of said frame.

The dividing-knives by which each slice is separated into a series of parallel splints consist, as shown particularly in Figs. 10 and 11, of a series of thin upright blades G, arranged side by side between clamping-plates G', drawn together by bolts $G^2$, or equivalent clamping devices. The series of blades present their knives in a vertical position parallel with each other and in a common plane. They are separated by the intermediate spacing-plates $G^3$, which serve to hold their edges at uniform distances apart, equal to the required width or thickness of the splints.

In order to secure a proper action of these knives, it is necessary that they shall be moved downward and forward against the slice properly supported. This support is given to the slice by a stationary wooden block or anvil $G^4$, seated in an opening in the frame and sustained by a removable plate $G^5$, which admits of the anvil being readily replaced when necessary. The anvil is located directly opposite the dividing-knives, and the finger $F^3$, before alluded to, arranged to advance the slice supported by the guides F to a position between the anvil and the knives.

In order to give the knives the required downward and forward movement, I support and operate them in the manner represented in Figs. 1, 3, 5, and 6.

Figure 3:
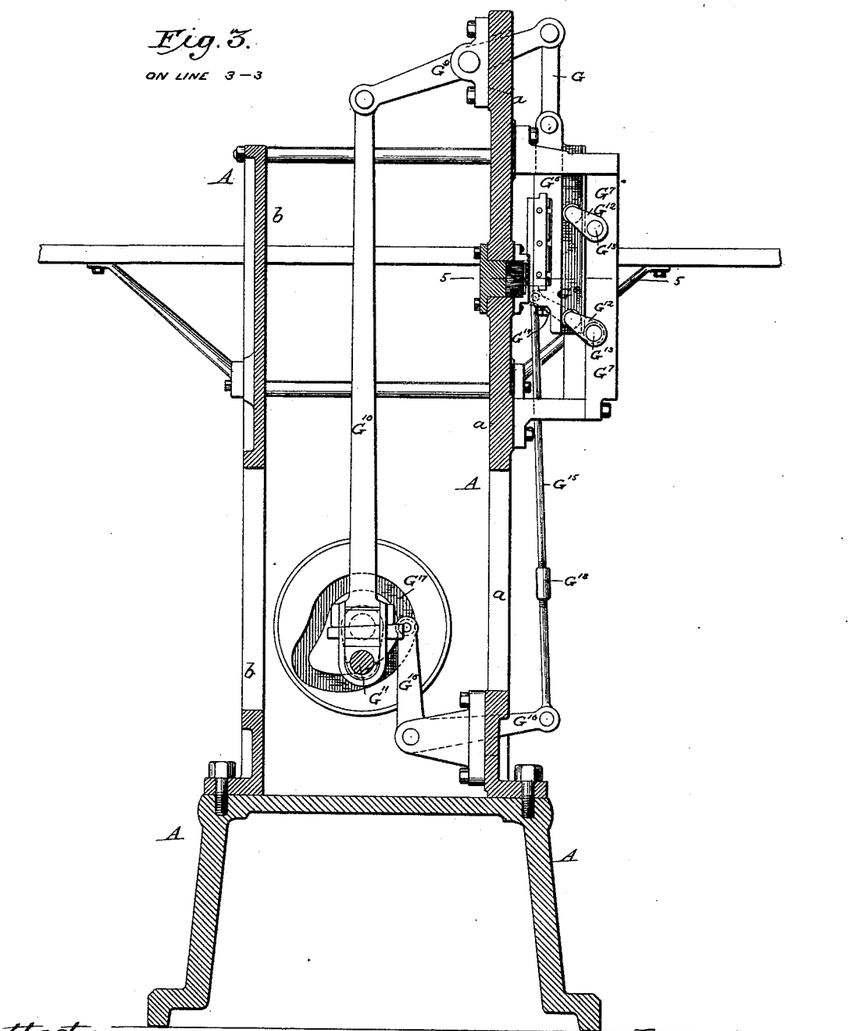
Fig. 3 is a similar section on the line 3 3 of Fig. 1.

The entire series of blades clamped together, as before described, are seated and secured in any appropriate manner in the face of an upright plate $G^6$, which is in turn seated against and guided by a vertical rib upon the face of a second vertical stationary plate $G^7$, the arrangement being such that the knife-bearing plate may be moved not only vertically, but also horizontally in relation to the other. The knife-bearing plate $G^6$ is connected by a link $G^8$ to one end of a lever $G^9$, pivoted on the main frame, and connected at its opposite end by a pitman $G^{10}$ to a crank $G^{11}$ on the main shaft $C^8$, before mentioned. The plate $G^6$ is grooved in its side face to receive rollers or studs on four arms $G^{12}$, secured to the ends of two horizontal rock-shafts $G^{13}$, which are mounted in the stationary plate $G^7$ or other suitable support. The lower rock-shaft $G^{13}$ has a third arm $G^{14}$, connected by a pitman $G^{15}$ to an angular lever $G^{16}$, which is pivoted to the main frame and provided at its inner end with a stud or roller entering a cam-groove $G^{17}$ in the side face of a wheel on the main shaft. The arrangement of the parts is such that after the slice is in position the crank $G^{11}$ acts through the intermediate parts to slide the knife-bearing plate $G^6$ downward, while at the same time the rock-shafts are turned and their arms $G^{12}$ caused to move the plate $G^6$ forward. By this compound downward and forward movement of the plate $G^6$ the edges of the knives are forced into and through the slice with a drawing or shearing action, whereby they are enabled to divide the splints cleanly and without shattering or fracturing the wood. After the slice is thus divided, the cam and crank act to return the knives to their original position. As before mentioned, the knives may be secured in the plate $G^6$ in any appropriate manner. I prefer, however, to groove or rabbet the receiving-recess horizontally on its upper and lower edges and to extend the intermediate separating-plates $G^3$ at their ends to enter these grooves, as shown in Figs. 3 and 10. This construction admits of the entire series of knives being slipped laterally into their position in the supporting-plate and of their being readily removed when required. Setscrews or equivalent fastenings will of course be required to prevent their accidental displacement. I provide the individual blades with horizontal slots, as shown, for the passage of the bolts $G^2$, so that the knives may be set forward to compensate for wear.

In order that the forward and backward movement of the knives may be regulated, I propose to provide an adjustable connection at any suitable point in the system of operating devices. I recommend as the simplest and best device for this purpose the pitman divided transversely, as shown in Fig. 3, with its two parts connected by a hollow nut or sleeve $G^{18}$, the rotation of which will serve to lengthen or shorten the pitman.

Figure 4:
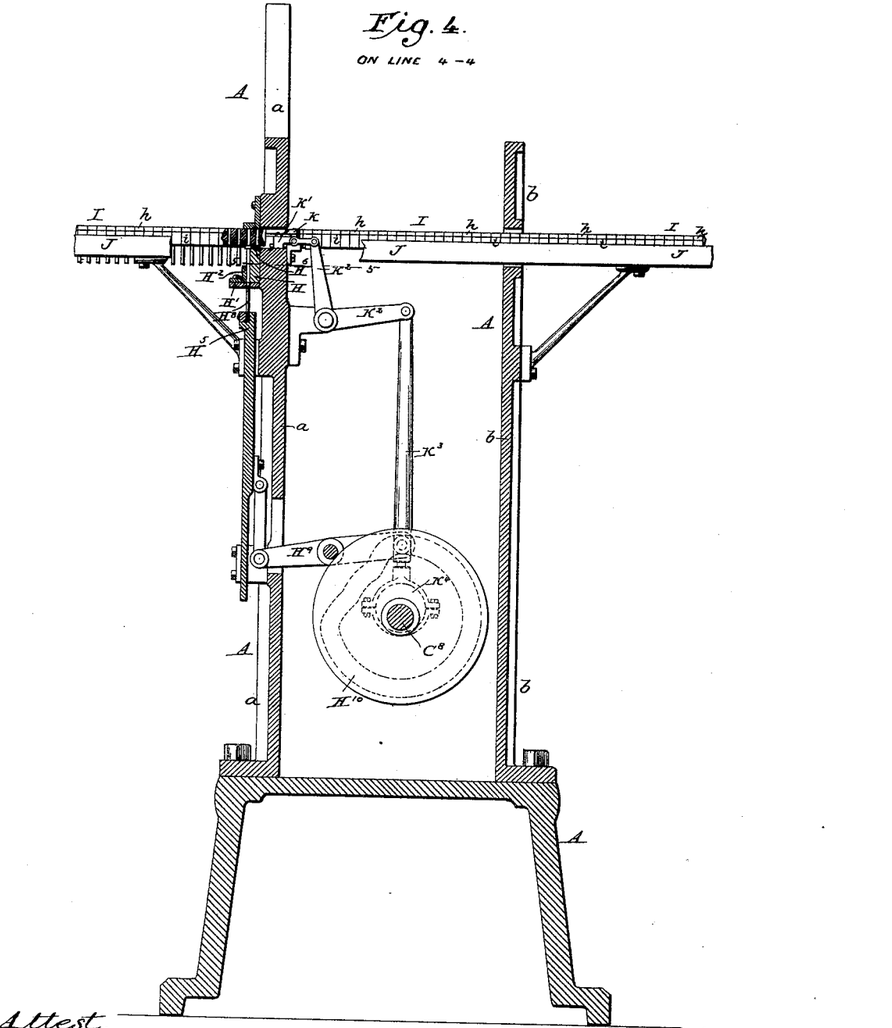
Fig. 4 is a view showing certain parts in side elevation and the remaining parts in vertical section on the line 4 4 of Fig. 1, looking in the direction indicated by the arrows and in the opposite direction from the preceding section.
Figures 5, 6, 7:
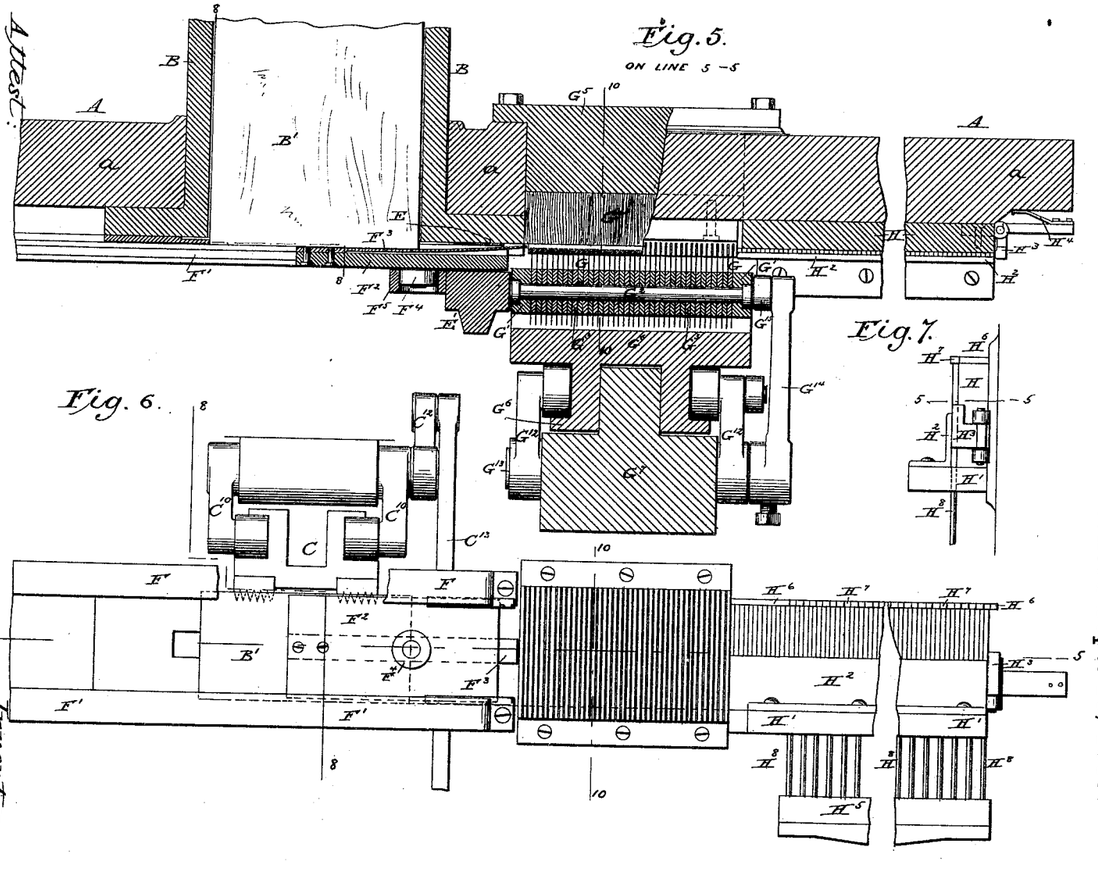
Fig. 5 is a horizontal section on the line 5 5 of Figs. 1, 2, and 3, showing particularly the slicing and dividing knives.
Fig. 6 is a front elevation showing more particularly the mechanism for holding the blank, transferring and dividing the slice, and framing the splints.
Fig. 7 is an end elevation of the parts shown in the preceding figures, illustrating particularly the yielding stop bearing against the line of splints at one end.

Having now described the entire mechanism by which the splints are produced, I will describe the devices by which they are inserted endwise into supporting-frames preparatory to their being dipped. As each slice advances from the block toward the dividing-knives it drives before it the series of splints produced by the division of the previous slice. The splints while thus advancing horizontally are supported, as shown in Figs. 1 and 4, between a back plate H, a bottom plate H', whereon they stand, and a front plate $H^2$, which extends upward to their middle, or thereabout, leaving their upper ends exposed at the front. These guiding-plates, which are fixed in position, extend to the extreme right of the machine, and the space between their outer ends is closed, as shown in Figs. 1, 5, 6, and 7, by one end of a pivoted finger or resistant $H^3$, pivoted to the frame and acted upon by a spring $H^4$. This yielding finger acts to oppose the advance of the foremost splint in the line, but permits the same to advance to a limited extent under circumstances and for a purpose which will presently appear.

At the right side of the machine, beneath the splint-supporting rail H', I mount a vertical reciprocating head $H^5$, having a series of vertical pins or fingers extending upward through openings in the supporting-rail in such manner as to act upon the lower ends of the splints and force the latter upward. These pins are made of a diameter somewhat less than that of the splints, and are spaced or arranged at such distances apart that they will act only upon every third splint in the series, though, if preferred, they may be arranged to act upon every second or fourth splint.

Directly over the space occupied by the splints I mount a fixed rail $H^6$, provided with openings or perforations $H^7$, located directly above the ejecting-pins $H^8$. This rail permits the splints which are acted upon to pass upward through the perforations, but acts to hold the intermediate splints from rising, and thus it is that at each action of the pins certain of the splints separated from each other are carried upward, while the others are permitted to remain between the guide-rails. After the descent of the ejecting-pins the remaining splints are assembled in close order by the advancing slice and splints, which crowd them together.

To receive the splints as they are forced upward, I provide a series of slotted frames I, the details of which will be hereinafter explained. These frames, having, as shown in Fig. 12, a series of parallel vertical slots from side to side, are passed horizontally one after another through the top of the machine on suitable guides J, being advanced step by step and permitted to rest with the successive slots directly over the rising splints, as shown in Fig. 4. The splints driven upward by the pins are forced at their upper ends firmly into the slots, the upper ends of the splints being at the same time carried above the front rail $H^2$, so that they may pass thereover as the frame is advanced. It is to be understood that the slots are filled one at a time, each slot receiving a series of splints separated from each other a distance such as to prevent their heads from adhering to each other when dipped.

I propose to employ means of any suitable character for advancing the frames and for operating the head which carries the ejecting-pins. I prefer, however, to form the frames, as shown in Fig. 12, with ratchet-teeth $h$ at their ends, to be acted upon by feeding-pawls K, pivoted to swing horizontally on reciprocating blocks K', which are suitably guided on the main frame and actuated through intermediate links from elbow-levers $K^2$, moved in turn by pitmen $K^3$, which have their lower ends mounted on eccentrics $K^4$ on the main shaft. By this combination of devices the plates are advanced in a positive manner step by step and their slots brought in regular succession over the splint-delivering devices.

Figure 14:
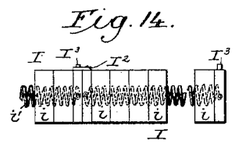
Fig. 14 is an end elevation of the same.
Figure 15:
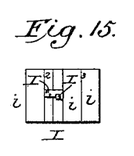
Fig. 15 is an end elevation showing a modified form of the device for coupling the frames together.

For convenience of operation I propose to provide the splint-receiving frames with coupling devices, by which they may be connected together in series, thus avoiding the necessity for constant attention on the part of the operator. In Fig. 14 I have shown for this purpose a hook $I^2$, attached to one frame and arranged to engage a pin $I^3$ on the next. In Fig. 15 I have shown a somewhat similar arrangement, the hooks being applied in this instance to the side instead of the top of the frames.

Figure 16:
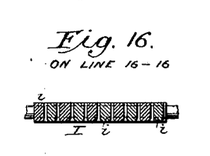
Fig. 16 is a vertical cross-section of the frame on the line 16 16 of Fig. 17.
Figure 17:
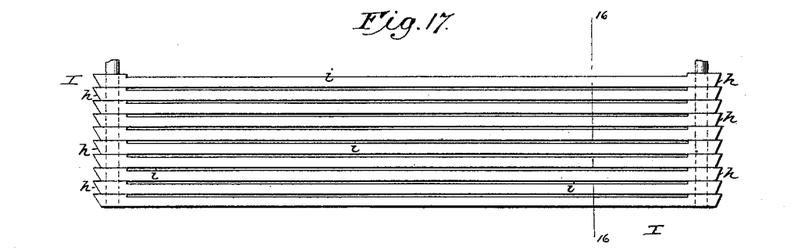
Fig. 17 is a plan view of the frame in a slightly-modified form.
Figure 18:
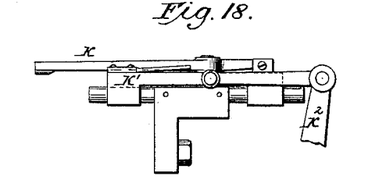
Fig. 18 is a side elevation of the mechanism for advancing the receiving-frames step by step through the machine.
Figure 19:
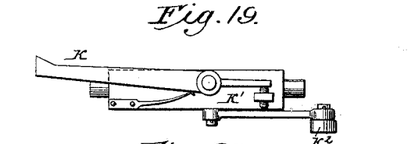
Fig. 19 is a top plan view of the same.

I construct the slots of the receiving-frames with their lower ends beveled or enlarged, as shown in Fig. 16, to facilitate the entrance of the splints and prevent them from being shattered or fractured.

The head or slide II, which carries the ejector-pins, as shown in Fig. 4, is connected by a link to one end of a lever $H^9$, pivoted in the main frame and provided at its opposite end with a stud or roller entering a cam-groove $H^{10}$ in the side face of a disk mounted on the main shaft. This cam is so shaped that the ejecting-pins are depressed and held at rest during the time that the splints are advancing laterally and while the frames are being advanced to present an empty slot, the frame itself remaining at rest during the rise of the pins.

The slotted receiving-frames may be made of wood or metal and in any suitable manner; but in order to avoid the fracturing of the splints when brittle wood is employed and to insure a firm holding of the splints therein I prefer to construct each frame of a series of parallel bars $i$, arranged side by side, as shown in Figs. 12, 14, 15, 16, and 17, their ends having a greater horizontal thickness than their middle portions, so that when assembled a series of slots or openings exist between them.

The bars forming each frame I connect by means of springs applied in any suitable manner which will urge them together, but admit of their separating to a limited extent when necessary to admit the ends of the splints between them. In Fig. 14, $i'$ represents spiral springs applied through openings in the ends of the bars for this purpose.

The ratchet-teeth with which the feed-dogs engage may be cheaply and advantageously formed by beveling the ends of the bars, as shown in the drawings.

In operating with some kinds of wood which are exceedingly brittle, and which therefore it is difficult to cut without splintering, it is advisable to modify the machine described above in certain minor particulars, which I will now explain.

Figure 22:
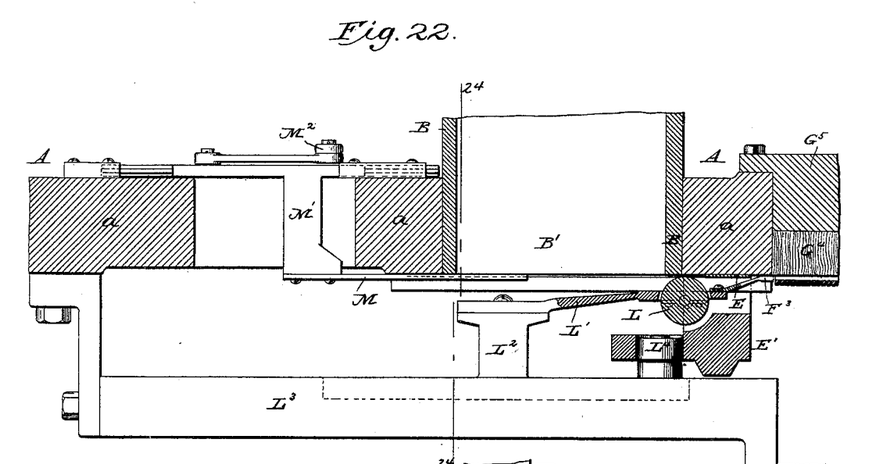
Fig. 22 is a horizontal section through the slicing-knife and adjacent parts, showing certain additional features for supporting the slice on the outer side.
Figures 23, 24, 25:
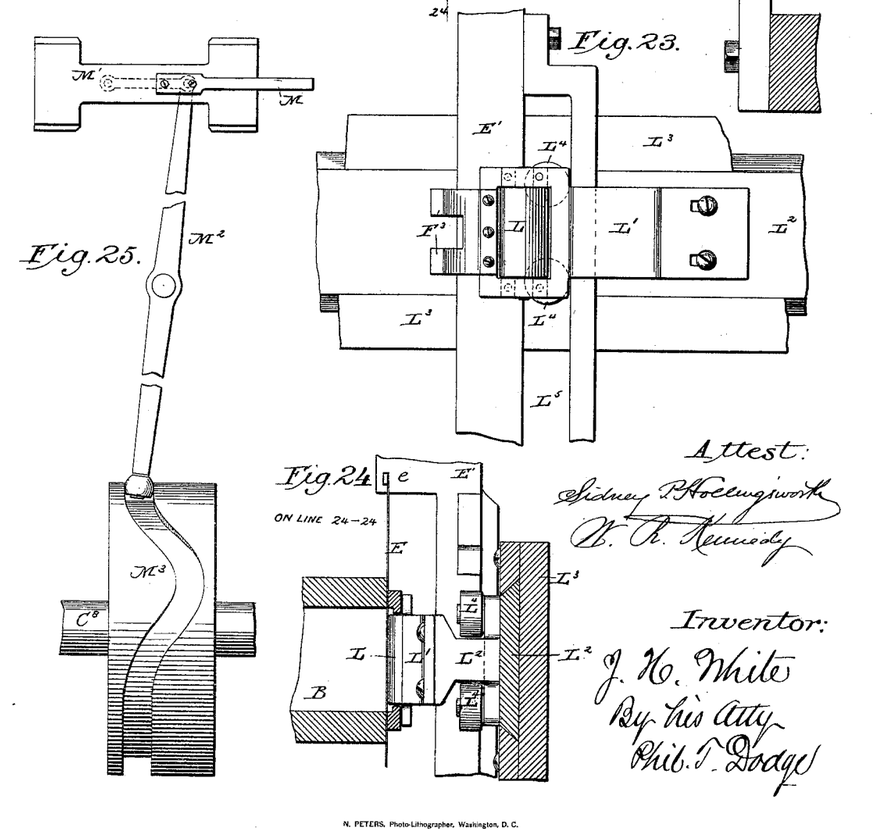
Fig. 23 is a front elevation of the parts shown in the preceding figure.
Fig. 24 is a section on the line 24 24, Figs. 22 and 23.
Fig. 25 is a view of the cam mechanism for operating the parts shown in the figures immediately preceding.

The first of the modifications relates to the means for supporting the slice on the outer face directly opposite the edge of the knife during the slicing action. This I accomplish by using a support of any suitable character, which advances with the knife. I prefer to employ, as shown in Figs. 22 and 23, a vertical cylindrical roll L, mounted in one end of a spring-arm $L'$, carried by a slide $L^2$, movable horizontally in a stationary guide $L^3$. This slide is actuated by a stud or roller $L^4$ on its side entering a vertical slot $L^5$ in the knife-carrying frame $E'$. As the knife moves forward across the inner face of the slice in the act of forming the latter, the roll travels forward on the outer face of the slice directly opposite the knife. The slice is thus prevented from curling and is firmly supported between the roll and the knife blade. When this slice-supporting roll is employed, the slice-advancing finger $F^3$ is attached to the roll-supporting arm, as shown. As the parts do not move under this arrangement a sufficient distance to carry the finger $F^3$ beyond the edge of the slice, it is necessary to provide means for giving the slice a preliminary movement in order that it may be brought within the reach of the finger. For this purpose I provide a horizontal sliding blade M, attached to a head $M'$, suitably guided on the frame and operated, as shown in Fig. 25, by a lever $M^2$ from a grooved cam-wheel $M^3$ on the main shaft. The finger M moves the slice forward until its rear edge is carried beyond the finger $F^3$, after which the latter acts, as in the first instance, to carry the slice forward to the dividing-knives.

Figures 26, 27, 28, 29:
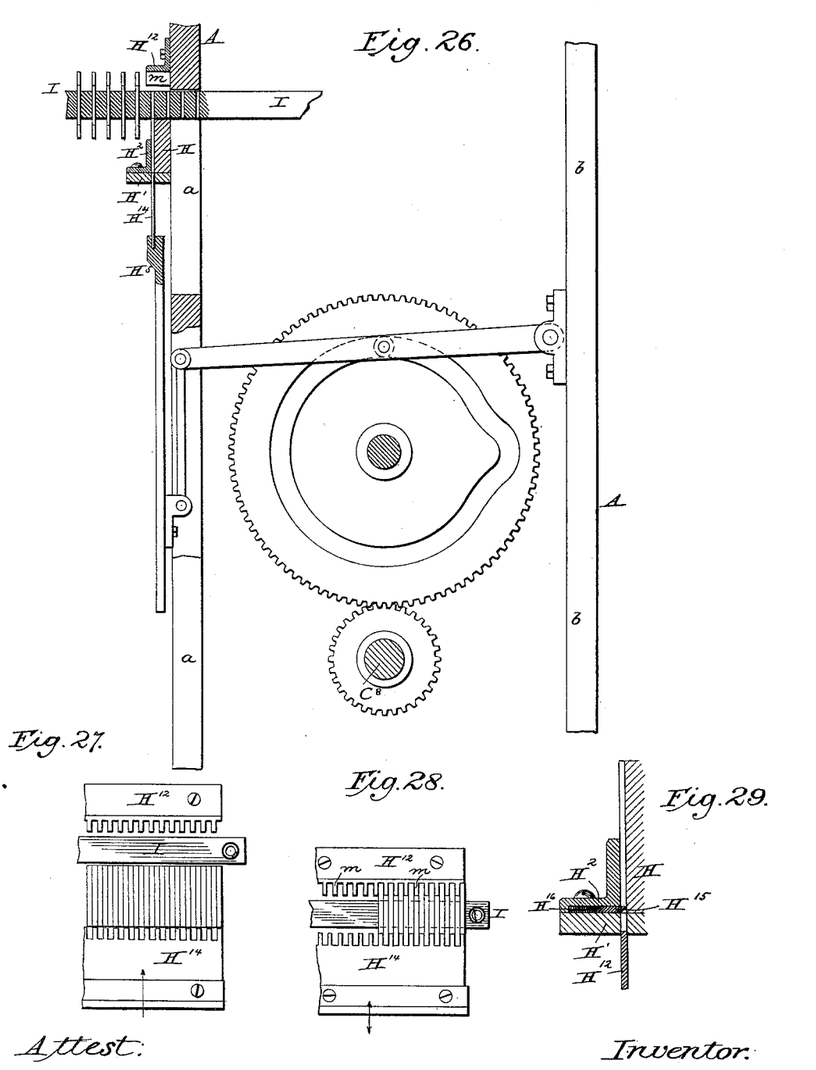
Fig. 26 is a vertical transverse section through the mechanism for delivering the splints into the dipping-frames in slightly-modified form.
Figs. 27 and 28 are front views showing the action of the framing devices.
Fig. 29 is a transverse vertical section through the devices for supporting the splints during the framing operation.

The framing or sticking mechanism heretofore described acts, it will be remembered, to place the splints in one side of the dipping-frame only, the splints being suitably separated and the intermediate spaces in the frame left vacant. In order to avoid the loss of this space, I propose to fill the slots solidly with splints from one end to the other, but to drive the alternate or intermediate splints through the frame until their ends project on the opposite side. In this manner the entire capacity of the frame is rendered available by the two series of splints projected on opposite sides, but separated at their heads, so that they may be dipped without causing their heads to adhere. To secure this insertion of the splints, it is only necessary to tooth the under surface of the stop-plate $H^{12}$, which overlies the ascending splints, to remove the plate $H^6$, as shown in Figs. 27, 28, and 29, and to substitute for the series of ejecting-pins a plate $H^{14}$, provided at its upper edge with short projecting pins and arranged to rise bodily through and above the splint-supporting rail $H'$. The ejecting-plates $H^{14}$ act, as before, upon the alternate splints to force them upward; but as these splints rise their friction upon the intermediate splints causes the latter to rise also—that is to say, the entire series of splints rises bodily into the frame. The splints which are supported by the pins continue their upward course until they project above the frame; but the intermediate splints encounter the pins or teeth $m$, projecting downward from the top rail, and, being arrested in their ascent thereby, they remain in position with their lower ends projecting below the frame. It will be perceived that the action is first to force the entire series of splints into the frame, then to arrest the alternate splints with their lower ends still projecting below the frame, while the others continue their upward movement until their upper ends rise above the frame.

In order to provide a smooth surface for the support of the splints as they are brought laterally between the guide-rails and over the plate H¹⁴, I provide a horizontal sliding plate H¹⁵, Fig. 29, urged forward by springs H¹⁶. When the pins descend, this plate moves forward over them, closing the bottom of the space between the vertical guide-rails, so that the splints are guided properly into place above the ejector and prevented from catching at their lower ends upon its pins. As the ejecting-pins rise, they act upon the forward beveled edge of this plate, which retreats to permit their passage.

The operation of the machine is as follows: The blanks being introduced into the guide or channel, and the machine set in motion, the feed-plate C is lifted, retracted, lowered into engagement with the blank, and moved forward, advancing the end of the blank beyond the mouth of the guide and holding the same rigidly in position. While the block is thus held the knife advances and removes a slice therefrom, this slice being supported at its upper and lower edges in the guides F. As the knife advances, the finger F³ passes beyond the edge of the slice, and during the retreat of the knife the slice is advanced by the finger between the guides F until it lies between the anvil G⁴ and the upright dividing-knives. These dividing-knives then move forward and downward, acting simultaneously and throughout the entire length of the slice to divide the same into splints. As these dividing-knives act at one time across the entire slice from top to bottom, they give lateral support to the splints which enter between them, thus preventing the shattering and splintering of wood which is of a brittle nature or which presents an irregular grain. After this division of the slice, the slicing-knives retreat, and in due time the next slice advanced by the finger F³ forces the series of newly-formed splints forward between the guides and into a position directly over the ejecting-head. The dipping-frames having been introduced into the machine, and a slot in one of these frames having been brought over the row of splints, the ejecting-head rises and drives the splints upward into the frame, as before explained. The finger H³ at the end of the splint guides or supports forms a yielding support for the forward end of the line, compensating for the slight variations in the size of the splints which will occur in practice.

It will be observed that the operation of my machine is entirely automatic, and that the division of the slice and the movement of the receiving-frames and the delivery of the splints into the frames are carried on in regular and proper order.

It is to be particularly noted that the machine presents a continuous guide by which the wood is supported and through which it travels from the primary formation of the slice to the final delivery of the splints.

Having thus described my invention, what I claim is—

1. In combination with the trough or conductor for the blanks, the toothed feeding-head, the peripherally-acting cam C⁸, and intermediate connections for advancing the head, the spring C⁹, to retract the head when relieved from the cam, the depressing-cam C⁷ and its intermediate connections, and the lifting-spring C¹⁵, whereby the feeding-head is positively engaged and moved forward with the blank and speedily lifted and retracted when relieved from the action of the cams.

2. The reciprocating feeding-head grooved in its sides, in combination with the rock-shaft and its arms provided with projections to enter the grooves and guide the head.

3. In combination with the trough or guide for the blanks and the slicing-knife movable across the mouth of the trough to sever the slice from the blank, the guide bars or rails F F′, arranged outside of the knife and transversely of the mouth of the trough, as described, in position to receive and sustain the edges of the slice as it is severed by the knife.

4. In combination with the trough or guide for the blanks, the slicing-knife movable across the mouth of the trough, the guide-bars F F′, lying outside of the knife in position to receive the edges of the slice, and the reciprocating finger F³, for advancing the slice between the guides beyond its original position in order that the next succeeding slice may enter the guides.

5. In combination with the knife-carrying frame, the trough or guide B, the guides F F′, the reciprocating plate provided with the finger to move the slices edgewise, and the inclined bar F⁵, attached to the knife-frame and acting to move said plate, whereby the retraction of the knife is caused to effect the advance of the slice edgewise from its original position.

6. The trough to guide the blanks, in combination with the slicing-blade movable across its mouth, the frame in which said blade is mounted, the guides F F′, to receive and sustain the slice, the reciprocating slide L², its yielding arm L′, and the roller mounted in said arm opposite the edge of the knife to sustain the slice, whereby the slices are formed and delivered to the supporting-guides.

7. In combination with the guide or channel for the blanks, the guides F, to sustain the blanks, the traveling roller, the reciprocating finger F³, to advance the blank, and the reciprocating finger M, whereby the blank is given an initial movement and carried within reach of the finger F³.

8. In a mechanism for dividing wooden slices into splints, the combination of a supporting-anvil, a series of parallel connected blades having their edges presented toward the anvil, a pressure mechanism to urge the knives toward the anvil, and an independent mechanism for reciprocating the knives longitudinally, whereby the cutting-edges are caused to act in the direction of their length as they are urged toward the anvil.

9. In combination with a series of vertical dividing-knives and their supporting-plate $G^6$, grooved in its edges, the rock-shafts and their arms $G^{12}$, with rollers or studs entering the grooves of said plate, the lever $G^9$, connected to said plate, and the pitman, lever, and cam for operating the rock-shafts.

10. In a machine for forming match-splints, the combination of a trough or conductor to sustain the blanks, a blade movable flatwise across the trough to remove slices from the blanks, transverse guides F F', lying outside of the knife to sustain the edges of the successive slices, a feed-finger which reciprocates lengthwise of the guides to advance the successive slices, an anvil to sustain the advanced slices on one side, and a series of parallel knives acting transversely of the guides to divide the slices into splints, whereby the splints are left in position between the guides.

11. In a match-machine, a mechanism for dividing the wooden slices into splints and retaining said splints in line, the same consisting of guides F F', to engage and sustain the edges of the slices, an anvil to sustain the slice on one side, a series of parallel knives extending transversely of the guides, and mechanism, substantially as shown, for advancing said knives edgewise against the slice, whereby the slice is divided into splints and the latter left in position between the guides.

12. In combination with the dividing-knives, the guides F F', and means for advancing the splints past the dividing-knives, the guide-rails adapted to receive and hold the lower ends of the splints, and the vertically-reciprocating head $H^5$, provided with pins or projections to force the splints upward.

13. In combination with the overlying splint-receiving frame and the vertically-movable splint-lifting head, the intermediate splint-guiding rails H $H^2$ with an opening at one end to permit the splints to enter laterally between them, the rail $H^2$ having its upper edge at suitable distance below the receiving-frame to permit the escape of fractured splints.

14. In a match-machine, the parallel splint-guiding rails H and $H^2$ and the reciprocating finger to feed the splints sidewise between said rails, a reciprocating feeder $H^5$, with its pins or fingers to deliver the splints endwise from the rails, and the yielding stop or finger $H^3$ at the end of the rail, as and for the purpose described.

15. In combination with the splint-receiving frame overlying the stop-plate, toothed or notched on its under side, and a splint lifting or ejecting head $H^5$, having a series of teeth or pins to deliver the splints through the receiving-frame, the teeth of the overlying plate being arranged opposite the spaces between the pins or teeth of the lifting-head, whereby the adjoining splints are projected on opposite sides of the frame.

16. In a match-machine, the combination of a continuous guide or channel, a slicing-knife by which the wooden slice is delivered into said guide, the reciprocating feeder for advancing the slices lengthwise of the guide, a series of parallel knives lying transversely of the guide and of the path in which the slices advance and acting to divide the slice while supported in the guide into splints.

17. In combination with a continuous guide or channel, a slicing-knife E, whereby the wooden slice is delivered into said channel, a reciprocating finger whereby the slice is advanced through said guide from its normal position, a series of parallel knives acting transversely of the guide to divide the slice supported therein, and a reciprocating ejecting-head acting to deliver the splints endwise from the guide, said parts constructed and arranged for joint operation substantially as described.

18. In combination with a guide or channel constructed, substantially as described, to sustain the edges of a wooden slice and the ends of the splints produced therefrom, a series of parallel knives acting transversely of the guides to divide the slice therein into splints, and a reciprocating feed device arranged to act on the successive slices, whereby the slices are advanced edgewise through the guide one against another, and thus the slices and splints advanced in close order to and beyond the dividing-knives.

In testimony whereof I hereunto set my hand, this 27th day of January, 1887, in the presence of two attesting witnesses.

JOHN H. WHITE.

Witnesses:
R. F. DeLacy,
C. M. Bawsel.